(12) United States Patent
Isaksson

(10) Patent No.: US 6,394,664 B1
(45) Date of Patent: May 28, 2002

(54) FIBER OPTIC MODULE

(75) Inventor: Jan Isaksson, Taby (SE)

(73) Assignee: Mitel Semiconductor AB, Jarfalla (SE)

( * ) Notice: Subject to any disclaimer, the term of this patent is extended or adjusted under 35 U.S.C. 154(b) by 0 days.

(21) Appl. No.: 09/225,679

(22) Filed: Jan. 6, 1999

(30) Foreign Application Priority Data

Jan. 31, 1998 (GB) .............................. 9802046

(51) Int. Cl.[7] .............................. G02B 6/42; G02B 6/36
(52) U.S. Cl. .......................................... 385/88; 385/89
(58) Field of Search ................... 385/88–94, 14

(56) References Cited

U.S. PATENT DOCUMENTS

| | | | |
|---|---|---|---|
| 4,149,072 A | | 4/1979 | Smith et al. ............. 250/199 |
| 5,073,046 A | | 12/1991 | Edwards et al. ............. 385/90 |
| 5,101,465 A | * | 3/1992 | Murphy ............. 385/88 |
| 5,295,214 A | | 3/1994 | Card et al. ............. 385/92 |
| 5,325,455 A | * | 6/1994 | Henson et al. ............. 385/89 |
| 5,555,333 A | * | 9/1996 | Kato ............. 385/89 |
| 5,590,232 A | * | 12/1996 | Wentworth et al. ............. 385/92 |
| 5,611,013 A | * | 3/1997 | Curzio ............. 385/89 |
| 5,781,682 A | * | 7/1998 | Cohen et al. ............. 385/89 |
| 6,015,239 A | * | 1/2000 | Moore ............. 385/92 |
| 6,034,808 A | * | 3/2000 | Isaksson ............. 359/245 |
| 6,085,007 A | * | 7/2000 | Jiang et al. ............. 385/92 |
| 6,130,979 A | * | 10/2000 | Isaksson et al. ............. 385/89 |

FOREIGN PATENT DOCUMENTS

| | | |
|---|---|---|
| GB | 2143651 | 2/1985 |
| WO | PCT/SE95/00713 | 12/1995 |

* cited by examiner

*Primary Examiner*—Rodney Bovernick
*Assistant Examiner*—Michael J. Stahl
(74) *Attorney, Agent, or Firm*—Birch, Stewart, Kolasch & Birch, LLP

(57) ABSTRACT

An optical module comprising an optoelectronic board having electrical connection sites for connection with an electrical circuit. The module includes a plurality of optoelectronic devices on the optoelectronic board and an optical fiber connector including a plurality of optical elements each for connection with a respective optoelectronic device. Cooperative alignment members on the optoelectronic board and the optical fiber connector are provided for aligning the optoelectronic devices on the board.

5 Claims, 2 Drawing Sheets

FIBER OPTIC MODULE

FIELD OF THE INVENTION

The present invention relates to a fiber optic module and more particularly, the present invention relates to a module where a plurality of optical elements may be mounted to an optoelectronic board.

BACKGROUND OF THE INVENTION

Interconnection of optical fibers to optoelectronic assemblies has always been problematic in the art. Connection between the fibers and optoelectronic devices is important for efficiency in the transmission of wavelength and power. Imprecise alignment causes aberrations in these parameters.

SUMMARY OF THE INVENTION

In view of the alignment difficulties known in the art, existing modules present limitations in terms of high costs and providing alignment and mounting optoelectronic devices on a circuit board. The present invention addresses these difficulties and in accordance with one aspect provides an optical module, comprising in combination:

a circuit board for receiving components;

at least one optoelectronic device mounted on the board, each optoelectronic device having a die;

first alignment means integrated with each die; and an optical fiber connector including an optical element for connection with the optoelectronic device, the connector including second alignment means for cooperative engagement with the first alignment means, whereby the optoelectronic device and the optical fiber connector are aligned together when the alignment means are engaged.

In a further aspect of one embodiment of the present invention, there is provided an optical module, comprising:

a circuit board for receiving components;

an optical die component having a frame therearound and first alignment means in the frame; and an optical fiber ferrule component containing optic fibers and including second alignment means for cooperative engagement with the first alignment means and for ensuring alignment of the die and the ferrule on the board.

The present invention facilitates connection of a series of electrical, optical or other optoelectronic elements to a circuit board, which board may then be integrated into a larger circuit, etc. Alignment between optical fiber connectors and optoelectronic devices is ensured by employing optoelectronic devices having a frame or die with alignment apertures. These apertures cooperatively engage other alignment members which may comprise pins or projections associated with the fiber connector.

It will be understood that the pins/projections may be associated with the optoelectronic device as an alternative. Further, loose pins may also be employed for connection within apertures provided in the optoelectronic device and connector.

Having thus generally described the invention, reference will now be made to the accompanying drawings illustrating preferred embodiments.

BRIEF DESCRIPTION OF THE DRAWINGS

Similar numerals used in the text denote similar elements.

DETAILED DESCRIPTION OF THE PREFERRED EMBODIMENTS

Figure 1:
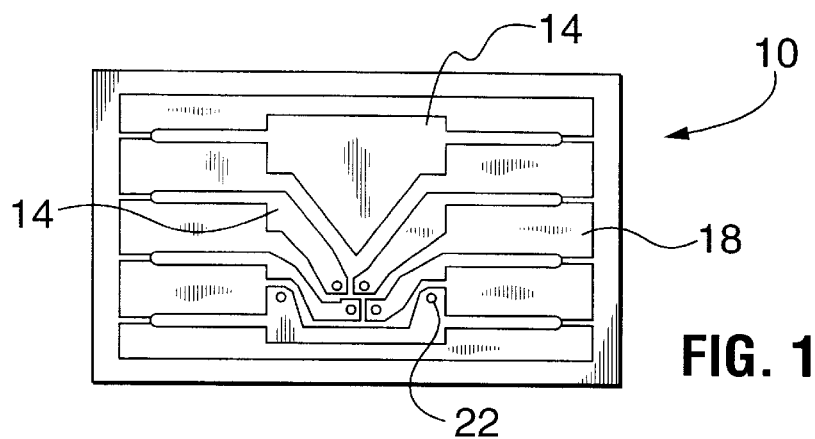
FIG. 1 is a plan view of one embodiment of an optoelectronic board for use with the present invention.
Figure 2:
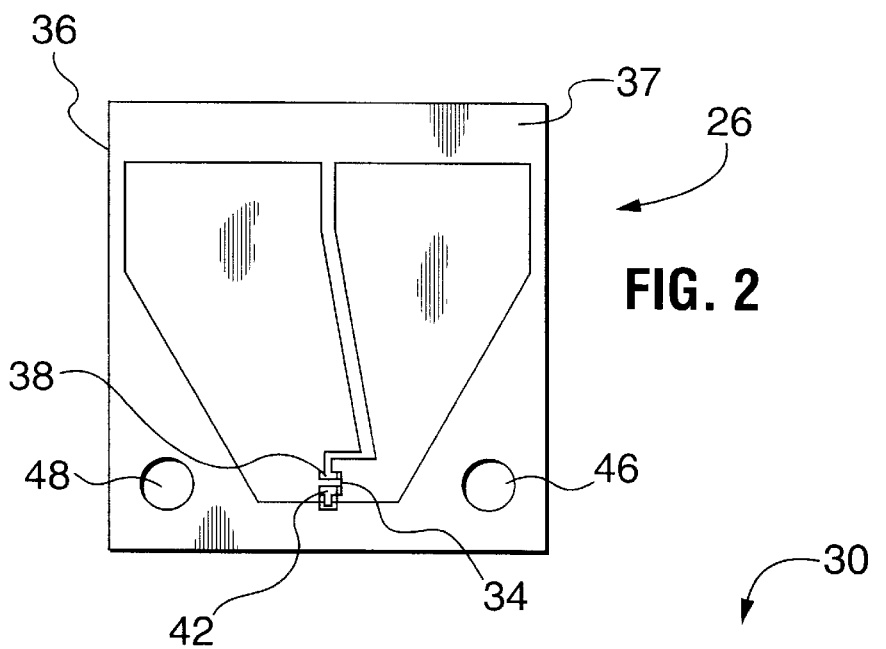
FIG. 2 is a plan view of a lead frame for a flip chip mounted optical die.

Referring now to the drawings, the electronic board 10 includes optoelectronic devices 14 and other circuits (not shown) forming a module. The devices 14 each have connection sites 18 for connection with an electrical circuit (not shown). The electronic board 10 includes connections 22 for mounting optical elements 26 or 30 shown in FIGS. 2 and 3, respectively or for surface mounting of other optoelectronic devices.

Figure 3:
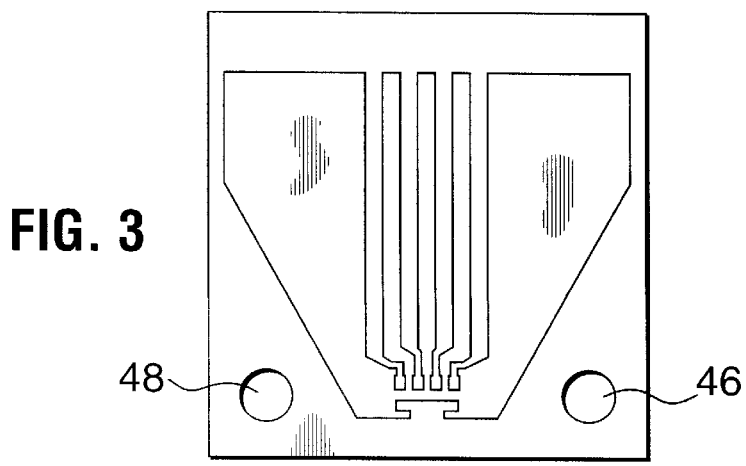
FIG. 3 is a plan view of a lead frame for a flip chip mounted optical array.
Figure 4:
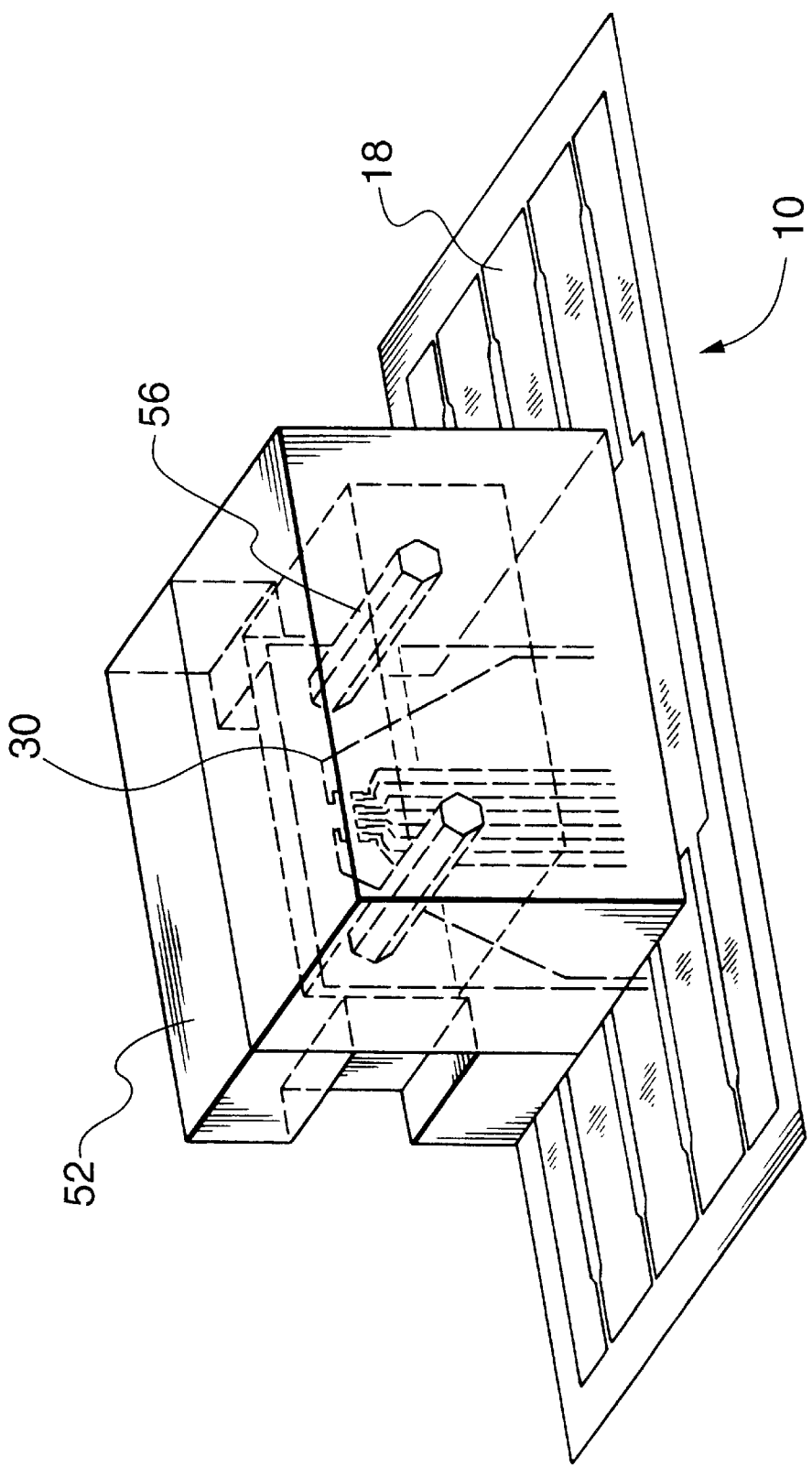
FIG. 4 is a perspective view of one embodiment of a module in accordance with the present invention.

Optical element 26 includes an optical die, e.g. a laser diode 34, having contact pads 38 and 42. A frame 36 surrounds die 34 and includes a lead frame 37. This configuration facilitates flip chip bonding of the diode 34. FIG. 3 illustrates an optical die array. Each of the elements 26 and 30 include alignment apertures 46 and 48 for ensuring alignment of the elements 26 and 30 with a fiber ferrule connector 52, shown in FIG. 4. To this end, connector 52 includes guide pins 56 for cooperative engagement within apertures 46 and 48.

In terms of the optical elements, the same may comprise super luminescence diodes, surface emitting lasers, vertical cavity surface emitting lasers as well as others known to those skilled in the art.

In addition to optoelectronic components, non-optical components may be mounted commonly to the board 10 while facilitating alignment between connector 52 and optical die 26.

In the case where the optical die array is used, the connector 52 will carry sufficient optical elements for connection to a respective device.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An optical module, comprising in combination:

a circuit board for receiving components;

at least one optoelectronic device mounted on said board, each said optoelectronic device having a die, with said die having a lead frame;

first alignment means integrated with each said lead frame of each said die;

electrical connection means integrated with said lead frame of said die for connecting said device to said circuit board; and an optical fiber connector including an optical element for connection with said lead frame of said optoelectronic device, said connector including second alignment means for cooperative engagement with said first alignment means, whereby said optoelectronic device and said optical fiber connector are aligned together when said alignment means are engaged.

2. The optical module as set forth in claim 1, wherein said optical fiber connector comprises a fiber ferrule.

3. The optical module as set forth in claim 1, wherein said optoelectronic device comprises super luminescence lasers, surface emitting lasers, or vertical cavity surface emitting lasers.

4. The optical module as set forth in claim 1, wherein said second alignment means comprises guide pins on said fiber connector.

5. The optical module as set forth in claim 1, wherein said module includes a plurality of optoelectronic devices, said devices arranged in parallel relation.

* * * * *